(12) United States Patent
Kropaczek et al.

(10) Patent No.: US 7,487,133 B2
(45) Date of Patent: Feb. 3, 2009

(54) METHOD AND APPARATUS FOR ADAPTIVELY DETERMINING WEIGHT FACTORS WITHIN THE CONTEXT OF AN OBJECTIVE FUNCTION

(75) Inventors: David Joseph Kropaczek, Kure Beach, NC (US); William Charles Cline, Wilmington, NC (US); William Earl Russell, II, Wilmington, NC (US)

(73) Assignee: Global Nuclear Fuel - Americas, LLC, Wilmington, NC (US)

( * ) Notice: Subject to any disclaimer, the term of this patent is extended or adjusted under 35 U.S.C. 154(b) by 1103 days.

(21) Appl. No.: 10/246,718

(22) Filed: Sep. 19, 2002

(65) Prior Publication Data

US 2004/0059696 A1 Mar. 25, 2004

(51) Int. Cl.
*G06F 17/00* (2006.01)
*G06N 5/02* (2006.01)

(52) U.S. Cl. ............................. 706/46; 700/28; 703/1
(58) Field of Classification Search .................. 706/46; 700/28; 703/1
See application file for complete search history.

(56) References Cited

U.S. PATENT DOCUMENTS

| | | | |
|---|---|---|---|
| 4,330,367 A | 5/1982 | Musick |
| 4,459,259 A | 7/1984 | Colley |
| 4,552,718 A | 11/1985 | Impink |
| 4,853,175 A | 8/1989 | Book, Sr. |
| 4,997,617 A | 3/1991 | Newton et al. |
| 5,009,833 A | 4/1991 | Takeuchi et al. |
| 5,023,045 A | 6/1991 | Watanabe et al. |
| 5,091,139 A | 2/1992 | Chao et al. |
| 5,171,516 A | 12/1992 | Iwamoto |
| 5,267,346 A | 11/1993 | Maruyama et al. |
| 5,272,736 A | 12/1993 | Wolters, Jr. et al. |
| 5,309,485 A | 5/1994 | Chao |
| 5,311,562 A | 5/1994 | Palusamy et al. |
| 5,392,320 A | 2/1995 | Chao |
| 5,438,527 A | 8/1995 | Feldbaumer et al. |

(Continued)

FOREIGN PATENT DOCUMENTS

DE    44 16 463    11/1994

(Continued)

OTHER PUBLICATIONS

A. E. Eiben et al., Constraint Satisfaction Problems, 1995, IOP Publishing Ltd and Oxford University Press, 1-8.*

(Continued)

*Primary Examiner*—Joseph P Hirl
(74) *Attorney, Agent, or Firm*—Harness, Dickey & Pierce, PLC

(57) ABSTRACT

The method and apparatus adaptively determine weighting factors within the context of an objective function for handling optimality conditions and constraints within an optimization search. The objective function is defined as a sum of credit and penalty components. The credit components represent the optimality conditions for the problem. The penalty components represent the constraint violations for the problem. Initially, each component is made up of a weight multiplied by a mathematical expression, called a term, that quantifies either an optimality condition or a constraint violation. The set of credit and penalty weights are adaptively determined based on the progress of an optimization search. Both static and dynamic representations of the modified objective function are used to perform the adaption.

30 Claims, 4 Drawing Sheets

U.S. PATENT DOCUMENTS

| | | | |
|---|---|---|---|
| 5,530,867 | A | 6/1996 | Beran |
| 5,631,939 | A | 5/1997 | Haraguchi et al. |
| 5,636,328 | A | 6/1997 | Kautz et al. |
| 5,726,913 | A | 3/1998 | Grimsrud |
| 5,781,430 | A | 7/1998 | Tsai |
| 5,790,616 | A | 8/1998 | Jackson |
| 5,790,618 | A | 8/1998 | Fawks, Jr. |
| 5,793,636 | A | 8/1998 | Cooney et al. |
| 5,812,622 | A | 9/1998 | Chang et al. |
| 5,855,009 | A | 12/1998 | Garcia et al. |
| 5,859,885 | A | 1/1999 | Rusnica et al. |
| 5,912,933 | A | 6/1999 | Shaug et al. |
| 5,923,717 | A | 7/1999 | Fawks, Jr. |
| 5,940,816 | A | 8/1999 | Fuhrer et al. |
| 6,031,984 | A | 2/2000 | Walser |
| 6,272,483 | B1 | 8/2001 | Joslin et al. |
| 6,311,313 | B1 | 10/2001 | Camporese et al. |
| 6,345,240 | B1 | 2/2002 | Havens |
| 6,748,348 | B1 * | 6/2004 | Russell, II ................... 703/6 |
| 2003/0086520 | A1 | 5/2003 | Russell, II et al. |

FOREIGN PATENT DOCUMENTS

| | | |
|---|---|---|
| DE | 198 45 988 | 4/1999 |
| EP | 0 786 782 A1 | 7/1997 |
| EP | 0 823 712 A1 | 2/1998 |

OTHER PUBLICATIONS

A. E. Eiben et al., Self-adaptivity for constraint satisfaction: Learning Penalty Functions, 1996, IEEE, 0-7803-2902-3, 258-261.*

Sami Khuri et al., The Zero/One Multiple Knapsack Problem and Genetic Algorithms, 1994, ACM. 089791-647-6, 188-193.*

Robert W. LLewellyn, Linear Programming, 1964, Holt, Rinehart and Winston, Inc., 97-98.*

Hamida, S. Ben et al. "The need for improving the exploration operators for constrained optimization problems." Proc. Of the 2000 Congress on Evolutionary Computation, San Diego, USA, 2000, pp. 1176-1183.

Michalewicz, Zbigniew et al. "Genocop III: A Co-evolutionary Algorithm for Numerical Optimization Problems with Nonlinear Constraints." Proc. Second IEEE Intl. Conf. Evolutionary Computation, D.B. Fogel (ed). IEEE Press, pp. 647-651, 1995.

Schoenauer, Marc et al. "Evolutionary Computation at the Edge of Feasibility." Proc. 4th Conf. Parallel Problems Solving from Nature, W. Ebeling and H.-M. Voigt (eds.), Springer-Verlag, pp. 573-580, 1996.

Bäck, Thomas et al. "A Survey of Evolution Strategies." Proc. 4th Intl. Conf. Genetic Algorithms, R.K. Belew and L.B. Booker (eds.), Morgan Kauffman, pp. 2-9, 1991.

Joines, Jeffrey A. et al. "On the Use of Non-Stationary Penalty Functions to Solve Nonlinear Constrained Optimization Problems with GA's." Proc. 1st IEEE Intl. Conf. Evolutionary Computation, D.B. Fogel (ed.) IEEE Press, pp. 579-584, 1994.

Eiben, A. E. et al. "SAW-ing EAs: adapting the fitness function for solving constrained problems." *New Ideas in Optimization*. McGraw-Hill, London, D. Corne, M. Dorigo, F. Glover (eds.), pp. 389-402, 1999.

Coit, David W. et al. "Adaptive Penalty Methods for Genetic Optimization of Constrained Combinatorial Problems." Informs Journal on Computing, 8(2): 173-182, 1996.

Moore, Brian R. et al. "Formosa-B: A Boiling Water Reactor In-Core Fuel Management Optimization Package." Nuclear Technology, vol. 126, pp. 153-169, May 1999.

Karve, A.A. et al. "Formosa-B: A Boiling Water Reactor In-Core Fuel Management Optimization Package II," *Nucl. Technol.*, 131, 48-68 (2000).

Hadj-Alouane, A.B. et al. "A Genetic Algorithm for the Multiple-Choice Integer Program." Operations Research, 45 (1), pp. 92-101, 1997.

Hornaifar, A. et al. "Constrained Optimization via Genetic Algorithms" Simulation 62 (4), pp. 242-254, 1994.

Patent Abstracts of Japan, 04132995, publication date May 7, 1992; Shiratori Yoshitake, "Expert System Supporting Preparation of Planning for Fuel Replacement".

CRC Handbook of Mathematical Sciences, 5th Edition, William H. Beyer, CRC Press, 1985.

Karve et al. "Effectiveness of BWR Control Rod Pattern Sampling Capability in the Incore Fuel Management Code Formosa-B", *M & C*'99, Sep. 1999, Madrid Spain, pp. 1459-1468.

\* cited by examiner

FIG. 3

| | | | Objective | |
|---|---|---|---|---|
| Optimization Constraints — 58 | | Exposure | Add Funct. | |
| Constraint Description | Importance | Dependence | Design Value | Optimization Credits |
| Maximum MFLCPR — 50 | Nominal | ☐ Edit | 0.964 | ☐ | None |
| Maximum MFLPD — 50 | Nominal — 56 | ☐ Edit | 0.957 — 52 | ☐ — 54 | None |
| Maximum MAPLHGR | Nominal | ☐ Edit | 0.957 | ☐ | None |
| Minimum % Flow | Nominal | ☐ Edit | 85.0 | ☐ | None |
| Maximum % Flow | None | ☐ Edit | 100.0 | ☐ | None |
| Eigenvalue Upper Tolerance (ΔCycle) | None | ☐ Edit | 1.0E-4 | ☐ | None |
| Eigenvalue Lower Tolerance (ΔCycle) | | ☐ Edit | 1.0E-4 | | | ePrometheus - Hatch 1 - Cycle 1 - Test 5b - CS10:2671 <Online Operation>
WorkSpace  Input  Run  View  Reports  Window  Help Input Deck Plant Configuration | Optimization Configuration | Optimization Constraints | Operations Configuration | Fuel Shuffling | Eigenvalue & Operating Limit | Select Files

METHOD AND APPARATUS FOR ADAPTIVELY DETERMINING WEIGHT FACTORS WITHIN THE CONTEXT OF AN OBJECTIVE FUNCTION

BACKGROUND OF THE INVENTION

Most problems encountered in engineering design are nonlinear by nature and involve the determination of system parameters that satisfy certain goals for the problem being solved. Such problems can be cast in the form of a mathematical optimization problem where a solution is desired that minimizes a system function or parameter subject to limitations or constraints on the system. Both the system function and constraints are comprised of system inputs (control variables) and system outputs, which may be either discrete or continuous. Furthermore, constraints may be equalities or inequalities. The solution to a given optimization problem has either or both of the following characteristics: 1) minimizes or maximizes a desired condition or conditions, thus satisfying the optimality condition and 2) satisfies the set of constraint equations imposed on the system.

With the above definitions, several categories of optimization problems may be defined. A Free Optimization Problem (FOP) is one for which no constraints exist. A Constraint Optimization Problem (COP) includes both constraints and a minimize (or maximize) condition(s) requirement. In contrast, a Constraint Satisfaction Problem (CSP) contains only constraints. Solving a CSP means finding one feasible solution within the search space that satisfies the constraint conditions. Solving a COP means finding a solution that is both feasible and optimal in the sense that a minimum (or maximum) value for the desired condition(s) is realized.

The solution to such a problem typically involves a mathematical search algorithm, whereby successively improved solutions are obtained over the course of a number of algorithm iterations. Each iteration, which can be thought of as a proposed solution, results in improvement of an objective function. An objective function is a mathematical expression having parameter values of a proposed solution as inputs. The objective function produces a figure of merit for the proposed solution. Comparison of objective function values provides a measure as to the relative strength of one solution versus another. Numerous search algorithms exist and differ in the manner by which the control variables for a particular problem are modified, whether a population of solutions or a single solution is tracked during the improvement process, and the assessment of convergence. However, these search algorithms rely on the results of an objective function in deciding a path of convergence. Examples of optimization algorithms include Genetic Algorithms, Simulated Annealing, and Tabu Search.

Within optimization algorithms, the critical issue of handling constraints for COPs and CSPs must be addressed. Several classes of methods exist for dealing with constraints. The most widespread method is the use of the penalty approach for modifying the objective function, which has the effect of converting a COP or CSP into a FOP. In this method, a penalty function, representing violations in the set of constraint equations, is added to an objective function characterizing the desired optimal condition. When the penalty function is positive, the solution is infeasible. When the penalty function is zero, all constraints are satisfied. Minimizing the modified objective function thus seeks not only optimality but also satisfaction of the constraints.

For a given optimization search, the penalty approach broadens the search space by allowing examination of both feasible and infeasible solutions in an unbiased manner. Broadening the search space during an optimization search often allows local minima to be circumnavigated more readily, thus making for a more effective optimization algorithm. In contrast, alternate methods for handling constraints, such as infeasible solution 'repair' and 'behavioral memory', are based on maintaining or forcing feasibility among solutions that are examined during the optimization search.

To implement the penalty approach, a mathematical expression is defined for each constraint that quantifies the magnitude of the constraint violation. For the given constraint, a weighting factor then multiplies the result to create an objective function penalty component. Summing all penalty components yields the total penalty. The larger the weighting factor for a given constraint, the greater the emphasis the optimization search will place on resolving violations in the constraint during the optimization search. Many approaches exist for defining the form of the penalty function and the weighting factors. As defined by the resultant modified objective function, weighting factors are problem specific and are bounded by zero (the constraint is not active) and infinity (the search space omits all violations of the constraint).

The simplest penalty function form is the 'death penalty', which sets the value of the weighting factor for each constraint to infinity. With a death penalty the search algorithm will immediately reject any violation of a constraint, which is equivalent to rejecting all infeasible solutions. Static penalties apply a finite penalty value to each constraint defined. A static weighting factor maintains its initial input value throughout the optimization search. Dynamic penalties adjust the initial input value during the course of the optimization search according to a mathematical expression that determines the amount and frequency of the weight change. The form of the penalty functions in a dynamic penalty scheme contains, in addition to the initial static penalty weighting factors (required to start the search), additional parameters that must be input as part of the optimization algorithm.

Similar to dynamic penalties, adaptive penalties adjust weight values over the course of an optimization search. In contrast, the amount and frequency of the weight change is determined by the progress of the optimization search in finding improved solutions. Several approaches for implementing adaptive penalty functions have been proposed. Bean and Hadj-Alouane created the method of Adaptive Penalties (AP), which was implemented in the context of a Genetic Algorithm. In the AP method, the population of solutions obtained over a preset number of iterations of the optimization search is examined and the weights adjusted depending on whether the population contains only feasible, infeasible, or a mixture of feasible and infeasible solutions. Coit, Smith, and Tate proposed an adaptive penalty method based on estimating a 'Near Feasibility Threshold' (NFT) for each given constraint. Conceptually, the NFT defines a region of infeasible search space just outside of feasibility that the optimization search would then be permitted to explore. Eiben and Hemert developed the Stepwise Adaption of Weights (SAW) method for adapting penalties. In their method, a weighting factor adjustment is made periodically to each constraint that violates in the best solution, thus potentially biasing future solutions away from constraint violations.

Several deficiencies exist in the penalty methods proposed. Death penalties restrict the search space by forcing all candidate solutions generated during the search to satisfy feasibility. In the static weighting factor approach, one must perform parametric studies on a set of test problems that are reflective of the types of optimization applications one would expect to encounter, with the result being a range of acceptable weight values established for each constraint of interest. The user would then select the weight values for a specific set of constraints based on a pre-established range of acceptable values. Particularly for COPs, varying the static weight values for a given problem can often result in a more or less optimal result. Similarly, dynamic penalties require the specification of parameters that must be determined based on empirical data. Fine-tuning of such parameters will often result in a different optimal result.

Penalty adaption improves over the static and dynamic penalty approaches by attempting to utilize information about the specific problem being solved as the optimization search progresses. In effect, the problem is periodically redefined. A deficiency with the adaptive penalty approach is that the objective function loses all meaning in an absolute sense during the course of an optimization search. In other words, there is no 'memory' that ties the objective function back to the original starting point of the optimization search as exists in a static penalty or dynamic penalty approach.

SUMMARY OF THE INVENTION

The invention is a method and apparatus for adaptively determining weighting factors within the context of an objective function for handling optimality conditions and constraints within an optimization search. The invention is not dependent on any particular optimization search technique so long as it conforms to a process of iterative improvement and a particular form for the objective function, defined as a sum of credit and penalty components. The credit components represent the optimality conditions for the problem. The penalty components represent the constraint violations for the problem. Initially, each component is made up of a weight multiplied by a mathematical expression, called a term, that quantifies either an optimality condition or a constraint violation.

The invention performs an adaptive determination of the set of credit and penalty weights based on the progress of the optimization search. The invention utilizes both static and dynamic representations of the objective function to perform the adaption. The static representation is based on a set of user defined input weighting factors that remain fixed throughout the optimization while the dynamic representation is the 'true' objective function as utilized by the optimization search in assessing solution fitness.

Within the invention, the adjustments to the weighting factors are performed during the course of the optimization search. In the presence of constraint violations, the magnitude of the penalty weight for the 'worst' penalty component is increased while simultaneously decreasing the weight for the remaining penalty and credit components. The worst penalty component is calculated from the product of the penalty weight and the penalty term, where the penalty weights are the initial static values, for example, as input by the user; thus, providing memory to tie the objective function back to the original starting point. In the absence of constraint violations, the magnitudes of the credit weights for the credit components are increased while maintaining the existing dynamic weight values for the penalty weights.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting on the present invention and wherein:

FIG. 3 illustrates a screen shot of an optimization constraints page listing optimization constraints associated with the optimization problem of boiler water reactor core design;

DETAILED DESCRIPTION OF THE EMBODIMENTS

The Generic Objective Function

Figure 1:
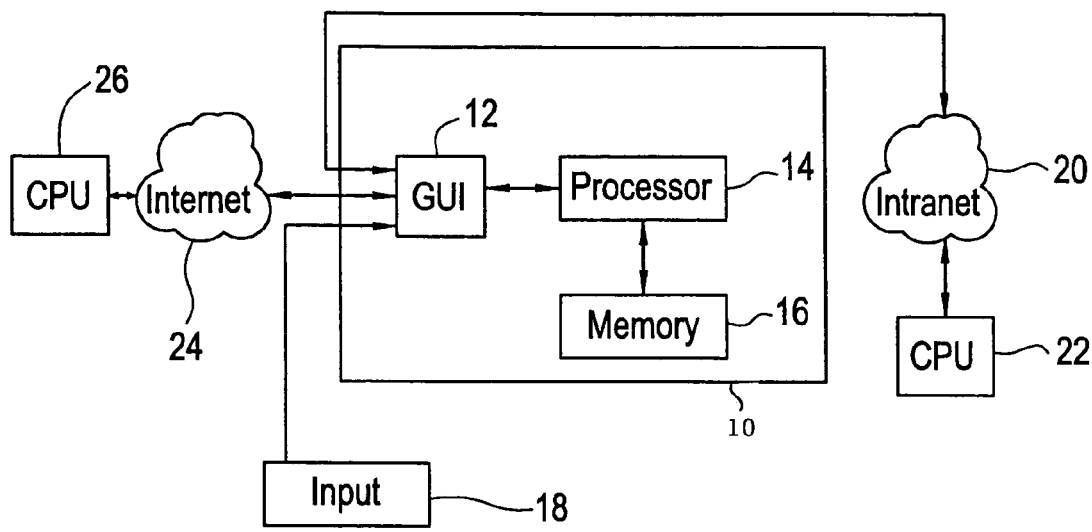
FIG. 1 illustrates an embodiment of an architecture according to the present invention.

The present invention applies, but is not limited to, a generic definition of an objective function, which is applicable across a wide variety of constraint and optimization problems. Namely, the generic objective function is applicable to any large scale, combinatorial optimization problem in discrete or continuous space such as boiler water reactor core design, pressurized water reactor core design, transportation scheduling, resource allocation, etc. The generic objective function is defined as a sum of credit and penalty components. A penalty component includes a penalty term multiplied by an associated penalty weight. A credit component includes a credit term multiplied by an associated credit weight. The credit terms represent the optimality conditions for the problem. The penalty terms represent the constraints for the problem. Each credit term is a mathematical expression that quantifies an optimality condition. Each penalty term is a mathematical expression that quantifies a constraint. Mathematically, this can be expressed as follows:

$$F_{obj} = \sum_m \lambda_m^{credit} C_m + \sum_n \lambda_n^{penalty} P_n$$

where,
$F_{obj}$=objective function
$C_m$=credit term m
$P_n$=penalty term n
$\lambda_m^{credit}$=weight factor credit term m
$\lambda_m^{penalty}$=weight factor penalty term n Credit and penalty terms may be defined by maximum (i.e. upper bounded) or minimum (i.e. lower bounded) values and can represent scalar or multi-dimensional values. The only requirements are: 1) the penalty terms must be positive for constraint violations and zero otherwise, and 2) in the absence of constraint violations, the credit terms are consistent with a minimization problem. Thus, minimizing the objective function solves the optimization problem.

As an example, consider an air-conditioning system where the optimization problem is to minimize the average air temperature within a room, yet assure that no region within the room exceeds a certain temperature. For this example, the credit would be the average air temperature within the room volume. The constraint would be a limit on the point-wise temperature distribution within the room, which, in the form of a penalty term, would be calculated as the average temperature violation. To obtain the average temperature violation one would sum the differences of actual and limiting temperature values for those points within the room that violate and divide by the total number of points. Alternatively, one could calculate the penalty term as the maximum value of the point-wise temperature violations within the room. The form of the generic objective function thus allows any number of credit and penalty terms to be defined in a general manner for the problem being solved.

Forms for the credit or penalty terms include, but are not limited to:

The maximum value within a data array;
The minimum value within a data array;
The average of values within a data array;
The integral of values within a data array;
The maximum of calculated differences between elements of a data array and the corresponding constraint limit, restricted to elements that violate;
The minimum of calculated differences between elements of a data array and the corresponding constraint limit, restricted to elements that violate;
The average of calculated differences between elements of a data array and the corresponding constraint limit, restricted to elements that violate; and
The integral of calculated differences between elements of a data array and the corresponding constraint limit, restricted to elements that violate.

A Generic Architecture for Implementing the Objective Function

FIG. 1 illustrates an embodiment of an architecture according to the present invention. As shown, a server 10 includes a graphical user interface 12 connected to a processor 14. The processor 14 is connected to a memory 16. The server 10 is directly accessible by a user input device 18 (e.g., a display, keyboard and mouse). The server 10 is also accessible by computers 22 and 26 over an intranet 20 and the Internet 24, respectively. The operation of the architecture shown in FIG. 1 will be discussed in detail below.

Configuring the Objective Function for an Optimization Problem

According to one embodiment, a configured objective function satisfying the above-described generic definition is already stored in the memory 16 of the server 10. For example, the configured objective function could have been configured according to one of the embodiments described below. In this embodiment, the user instructs the server 10 to provide a list of the configured objective functions stored in the memory 16, and instructs the server 10 to use one of the listed configured objective functions.

In another embodiment, a user via input 18, computer 26 or computer 22 accesses the server 10 over the graphical user interface 12. The user supplies the server 10 with a configured objective function meeting the definition of the above-described generic definition. In this embodiment, the user supplies the configured objective function using any well-known programming language or program for expressing mathematical expressions. Specifically, the user instructs the processor 14 via the graphical user interface 12 to upload a file containing the configured objective function. The processor 14 then uploads the file, and stores the file in memory 16.

In still another embodiment, configuring the objective function is interactive between the user and the server 10. Here, the user instructs the processor 14 to start the process for configuring an objective function. The processor 14 then requests the user to identify the number of credit components and the number of penalty components. For each credit component, the processor 14 requests that the user provide a mathematical expression for the credit term and an initial weight for the associated credit weight. For each penalty component, the processor 14 requests that the user provide a mathematical expression for the penalty term and an initial weight for the associated penalty weight. In supplying the mathematical expression, the processor 14 via the graphical user interface 12 accepts definitions of mathematical expressions according to any well-known programming language or program.

In another embodiment, the server 10 is preprogrammed for use on a particular constraint or optimization based problem. In this embodiment, the server 10 stores possible optimization parameters and possible constraint parameters associated with the particular optimization or constraint problem. When a user instructs the processor 14 via the graphical user interface 12 to configure an objective function, the processor 14 accesses the possible optimization parameters already stored in the memory 16, and provides the user with the option of selecting one or more of the optimization parameters for optimization.

Figure 2:
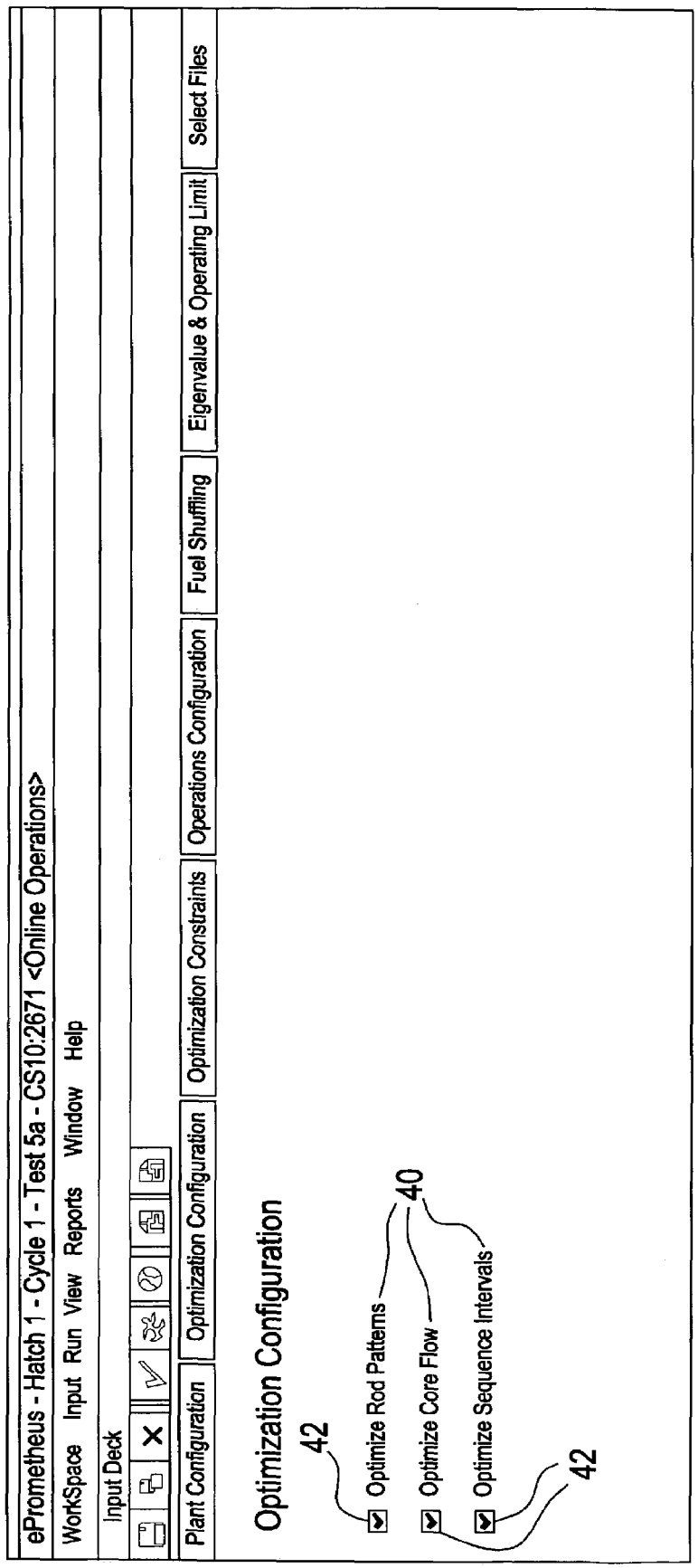
FIG. 2 illustrates a screen shot of an optimization configuration page used in selecting one or more optimization parameters associated with the optimization problem of boiler water reactor core design.

FIG. 2 illustrates a screen shot of a optimization configuration page used in selecting one or more optimization parameters associated with the optimization problem of boiler water reactor core design according to this embodiment of the present invention. As shown, the optimization parameters 40 of optimize rod patterns, optimize core flow, and optimize sequence intervals are available for selection by the user as optimization parameters. Optimize rod patterns means making an optimal determination of individual control rod positions within a control rod grouping (called a sequence), for the duration of time during the operating cycle when the given sequence is being used to control the reactor. Rod positions affect the local power as well as the nuclear reaction rate. Optimize core flow means making an optimal determination of reactor coolant flow rate through the reactor as a function of time during the operating cycle. Flow rate affects global reactor power as well as the nuclear reaction rate. Optimize sequence intervals means making an optimal determination of the time duration a given sequence (i.e., control rod grouping) is used to control the reactor during the operating cycle. Sequence intervals affect local power as well as the nuclear reaction rate.

Using the data input device 18, computer 22 or computer 26, each of which includes a display and a computer mouse, the user selects one or more of the optimization parameters by clicking in the selection box 42 associated with an optimization parameter 40. When selected, a check appears in the selection box 42 of the selected optimization parameter. Clicking in the selection box 42 again de-selects the optimization parameter.

The memory 16 also stores constraint parameters associated with the optimization problem. The constraint parameters are parameters of the optimization problem that must or should satisfy a constraint or constraints. FIG. 3 illustrates a screen shot of a optimization constraints page listing optimization constraints associated with the optimization problem of boiler water reactor core design according to this embodiment of the present invention. As shown, each optimization constraint 50 has a design value 52 associated therewith. Each optimization constraint must fall below the specified design value. The user has the ability to select optimization parameters for consideration in configuring the objective function. Using the data input device 18, computer 22 or computer 26, each of which includes a display and a computer mouse, the user selects an optimization constraint by clicking in the selection box 54 associated with an optimization constraint 50. When selected, a check appears in the selection box 54 of the selected optimization constraint 50. Clicking in the selection box 54 again de-selects the optimization constraint.

Each optimization parameter has a predetermined credit term and credit weight associated therewith stored in memory 16. Similarly, each optimization constraint has a predetermined penalty term and penalty weight associated therewith stored in memory 16. In the embodiment shown in FIG. 3, the penalty term incorporates the design value, and the user can change (i.e., configure) this value as desired. Additionally, the embodiment of FIG. 3 allows the user to set an importance 56 for each optimization constraint 50. In the importance field 58 for an optimization constraint, the user has pull down options of minute, low, nominal, high and extreme. Each option correlates to a predetermined penalty weight such that the greater the importance, the greater the predetermined penalty weight. In this manner, the user selects from among a set of predetermined penalty weights.

Once the above-selections have been completed, the processor 14 configures the objective function according to the generic definition discussed above and the selections made during the selection process. The resulting configured objective function equals the sum of credit components associated with the selected optimization parameters plus the sum of penalty components associated with the selected optimization constraints.

Optimization using the Objective Function

Figure 4:
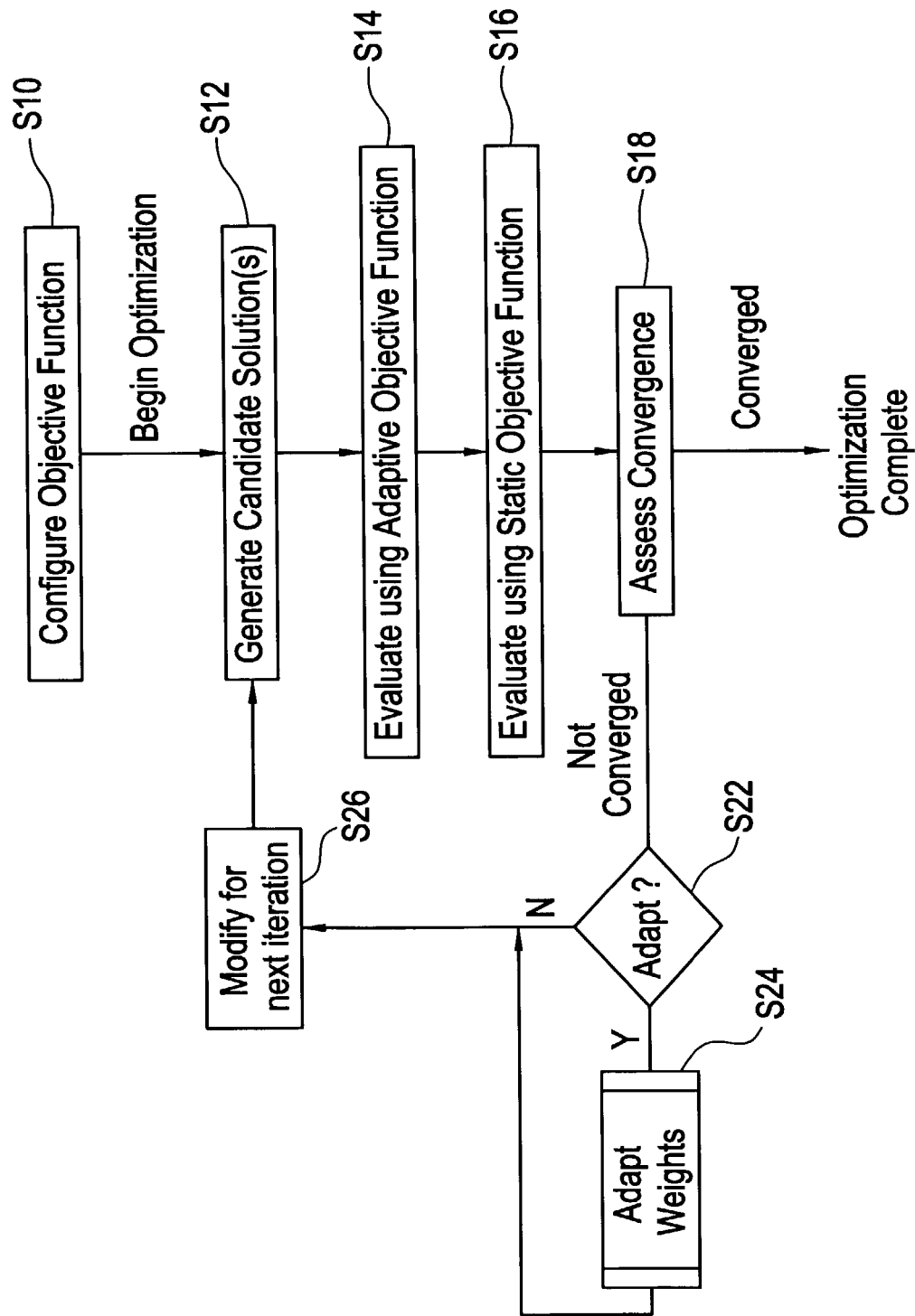
FIG. 4 illustrates a flow chart of an optimization process employing the method of adaptively determining weight factors according to the present invention.

FIG. 4 illustrates a flow chart of an optimization process employing the adaptive determination of weighting factors according to the present invention. For the purposes of explanation only, the optimization process of FIG. 4 will be described as being implemented by the architecture illustrated in FIG. 1. Accordingly, this process is performed when a user instructs the server 10 to perform such a process via input device 18, computer 22 or computer 26. As shown, in step S10 the objective function is configured as discussed above in the preceding section, then the optimization process begins. In step S12, the processor 14 retrieves from memory 16 or generates one or more sets of values for input parameters (i.e., system inputs) of the optimization problem based on the optimization algorithm in use. For example, for the optimization problem of boiler water reactor core design, some of the input parameters would be placement of fresh and exposed fuel bundles within the reactor, selection of the rod groups (sequences) and placement of the control rod positions within the groups as a function of time during the cycle, core flow as a function of time during a cycle, reactor coolant inlet pressure, etc. Each input parameter set of values is a candidate solution of the optimization problem. The processor 14 runs a simulated operation and generates a simulation result for each input parameter set of values. For example, for boiler water reactor core design, a well-known simulation program for boiler water reactor operation is run using an input parameter set. The simulation result includes values (i.e., system outputs) for the optimization parameters and optimization constraints. These values, or a subset of these values, are values of the variables in the mathematical expressions of the objective function.

Then, in step S14 and S16, the processor 14 uses an objective function and the system outputs to generate an objective function value for each candidate solution. Specifically, the objective function of step S16 includes the initial credit and penalty weights established when the objective function was configured. These initial credit and penalty weights are referred to as the static weights. The objective function of step S14 includes adapted penalty and credit weights, which were adapted in a previous iteration as discussed in detail below with respect to steps S22 and S24.

In step S18, the processor 14 assesses whether the optimization process has converged upon a solution using the objective function values generated in step S14. If convergence is reached, then the optimization process ends.

If no convergence is reached, processing proceeds to step S22, and the optimization process continues. As alluded to above, several iterations of steps S12-S18 usually take place before the optimization process is complete. In step S22, the processor 14 determines whether to perform adaptation of the credit and penalty weights based on the current iteration. For example, in one embodiment, the weight adaptation is performed at a predetermined interval (e.g., every five iterations). In another embodiment, the weight adaptation is performed at predetermined iterations. In a still further embodiment, the weight adaptation is performed randomly.

Figure 5:
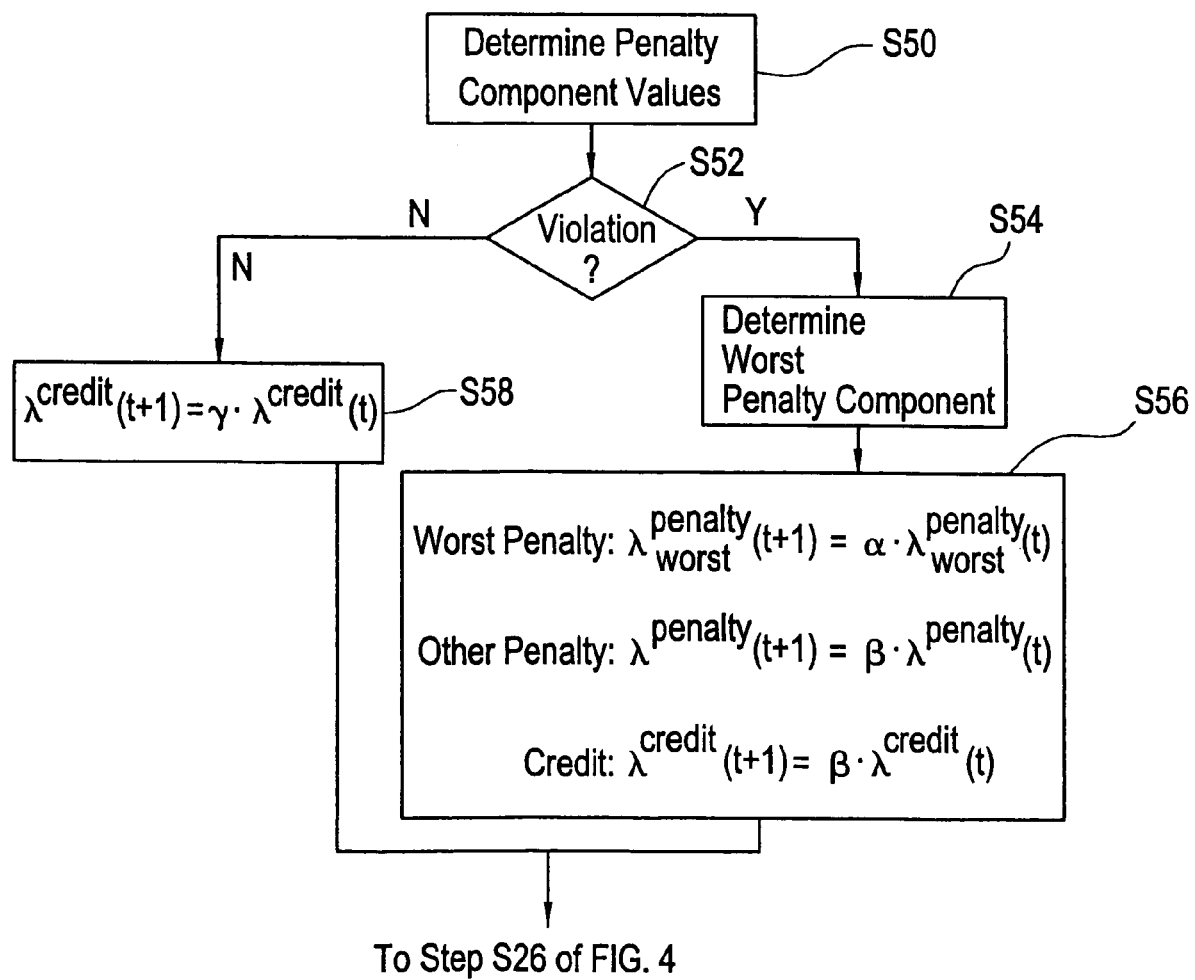
FIG. 5 illustrates a flow chart of an embodiment of the method of adaptively determining weight factors according to the present invention.

If the processor 14 decided to perform weight adaptation in step S22, then processing proceeds to step S24. In step S24 weight adaptation is performed as shown in FIG. 5. As shown in FIG. 5, in step S50, the processor 14 determines the value of the penalty components in the objective function using the static weights (i.e, the weights initially assigned to the credit and penalty components) and system outputs for the candidate solution producing the best objective function value when the adaptive weights are applied (Many optimization search algorithms proceed based on the candidate solution producing the best objective function value. Other optimization algorithms pursue more than one objective function value at a time.)

Next in step S52, the processor 14 determines whether any constraint violations exist based on the determinations made in step S50. A constraint violation exists when any penalty component is positive. If a constraint violation exists, then in step S54, the processor 14 determines the worst penalty component (greatest positive value) based on the determinations made in step S50. Then in step S56, the penalty weight for the worst penalty component is increased. In one embodiment, the increment is achieved by multiplying the penalty weight by a predetermined constant $\alpha$ that is greater than or equal to one. Also, in step S56, the weights of the other penalty components and the credit components are decreased. In one embodiment, the decrement is achieved by multiplying the weights by a predetermined constant $\beta$ that is less than or equal to one. After step S56, processing proceeds to step S26 of FIG. 4.

It should be understood that the incrementing and decrementing techniques in step S56 are not limited to multiplication. For example, incrementing and decrementing can be performed using any well-known mathematical operation. Additionally, it should be understood that the decrementing is not limited to decrementing the credit and penalty weights by the same amount or factor, and the incrementing and decrementing can change based on the iteration.

If no constraint violations exist in step S52, then in step S58, the processor increments the credit weight for each credit component. In one embodiment, the increment is achieved by multiplying the penalty weight by a predetermined constant γ that is greater than or equal to one. After step S58, processing proceeds to step S26 of FIG. 4.

It should be understood that the incrementing technique of step S58 is not limited to multiplication. For example, incrementing can be performed using any well-known mathematical operation. Additionally, it should be understand that the incrementing is not limited to incrementing each of the credit weights or incrementing the credit weights by the same amount or factor. And the incrementing can change based on the iteration.

Returning to FIG. 4, in step S26, the input parameter sets are modified, the optimization iteration count is increased and processing returns to step S12. The generation, convergence assessment and modification operations of steps S12, S18 and S26 are performed according to any well-known optimization algorithm such as Genetic Algorithms, Simulated Annealing, and Tabu Search. When the optimization problem is boiler water reactor core design, the optimization algorithm can be, for example, one of the optimization processes as disclosed in U.S. application Ser. No. 09/475,309, titled SYSTEM AND METHOD FOR OPTIMIZATION OF MULTIPLE OPERATIONAL CONTROL VARIABLES FOR A NUCLEAR REACTOR filed Dec. 30, 1999 or U.S. application Ser. No. 09/683,004, tilted SYSTEM AND METHOD FOR CONTINUOUS OPTIMIZATION OF CONTROL-VARIABLES DURING OPERATION OF A NUCLEAR REACTOR, filed Nov. 7, 2001.

The invention provides a systematic and general method for handling optimality conditions and constraints within the context of the penalty function approach for Constrained Optimization Problems (COPs) and Constraint Satisfaction Problems (CSPs), independent of the optimization search employed. Because of the flexibility of the invention, changes in optimality conditions, constraint term definitions, and adaptive parameter definitions are readily accommodated. Because the worst penalty component is calculated from the product of the penalty weight and the penalty term, where the penalty weights are the initial static values, for example, as input by the user; this adaptive methodology provides memory tying the objective function back to the original starting point. Also, in an alternative embodiment, the values of the adaptive and static objective function, as they change over time, are displayed as a plot or graph for the user on the input device 18, the computer 22 or the computer 26. In this manner, the user can see the static measure of the optimization progress.

The technical effect of the invention is a computer system that provides for adapting the objective function, used in determining the progress of an optimization operation, by adaptively adjusting the weight factors of the components forming the objective function.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A computer implemented method of adaptively adjusting an objective function providing a figure of merit for a proposed solution to a constraint problem with a processing device, comprising:

determining a value for each penalty component of the objective function, each penalty component including a penalty term multiplied by a weight factor from a first set of weight factors, the objective function including at least two penalty components;

determining a worst penalty component using the determined penalty component values, wherein the worst penalty component is one of the penalty components with the greatest value; and changing weight factors in a second set of weight factors that correspond to the determined worst penalty component and at least one other penalty component to create an adapted objective function such that the worst penalty component has increased emphasis.

2. The method of claim 1, wherein the changing weight factors comprises:

increasing the weight factor corresponding to the determined worst penalty component; and decreasing the weight factor corresponding to the at least one other penalty component.

3. The method of claim 2, wherein the decreasing the weight factor decreases the weight factor corresponding to each penalty component other than the determined worst penalty component.

4. The method of claim 2, wherein the increasing the weight factor increases the weight factor corresponding to the determined worst penalty component by multiplying the weight factor corresponding to the determined worst penalty component by a constant amount.

5. The method of claim 2, wherein the decreasing the weight factor decreases the weight factor corresponding to the at least one other penalty component by multiplying the weight factor corresponding to the at least one other penalty component by a constant amount.

6. The method of claim 1, wherein the objective function includes at least one credit component, each credit component including a credit term multiplied by a weight factor; and the changing weight factors further changes a weight factor corresponding to the credit component in the second set of weight factors.

7. The method of claim 6, wherein the changing weight factors decreases the weight factor corresponding to the credit component.

8. The method of claim 6, wherein the changing weight factors comprises:

increasing the weight factor corresponding to the determined worst penalty component by multiplying the weight factor corresponding to the determined worst penalty component by a first constant amount; and decreasing the weight factor corresponding to the at least one other penalty component and the credit component by multiplying the weight factors corresponding to the at least one other penalty component and the credit component by a second constant amount.

9. The method of claim 1, wherein the determining a value for each component receives a value for a term in at least one component from a simulator.

10. The method of claim 1, wherein the constraint problem is one of a boiling water reactor core design or a pressurized water reactor core design.

11. The method of claim 1, wherein the constraint problem is a large-scale, combinatorial optimization problem in one of discrete or continuous control variables.

12. The method of claim 1, wherein the first and second sets of weight factors have different values.

13. The method of claim 1, wherein the first set of weight factors is a set of static weight values; and the second set of weight factors includes current weight factor values used in an iterative optimization process, which includes the determining a value, the determining a worst penalty component, and the changing weight factors.

14. The method of claim 13, wherein the static weights are weights initially supplied by a user.

15. A computer implemented method of adaptively adjusting an objective function providing a figure of merit for a proposed solution to a constraint problem with a processing device, comprising:
first determining a value for each penalty component of the objective function, each component of the objective function including a term multiplied by a weight factor from a first set of weight factors, the objective function including at least one penalty component and at least one credit component;
second determining whether a constraint violation exists based on output from the determining a value;
if the second determining determines that a constraint violation does not exist, first changing a weight factor in a second set of weight factors that corresponds to the credit component; and
if the second determining determines that a constraint violation does exist,
third determining a worst penalty component using the determined penalty component values, wherein the worst penalty component is one of the penalty components with the greatest value, and
second changing weight factors in the second set of weight factors corresponding to the determined worst penalty component and at least one other component in the second set of weight factors to create an adapted objective function such that the worst penalty component has increased emphasis.

16. The method of claim 15, wherein the second determining determines that a constraint violation exists if a determined penalty component value is greater than zero.

17. The method of claim 15, wherein the changing a weight factor increases the weight factor corresponding to the credit component if the second determining determines that a constraint violation does not exist.

18. The method of claim 16, wherein the changing a weight factor increases the weight factor corresponding to the credit component by multiplying the weight factor corresponding to the credit component by a constant amount.

19. The method of claim 15, wherein the second changing changes the weight factors corresponding to the determined worst penalty component and the credit component.

20. The method of claim 15, wherein the second changing increases the weight factor corresponding to the determined worst penalty component and decreases the weight factors corresponding to each component other than the determined worst penalty component.

21. The method of claim 15, wherein the first determining receives a value for a term in at least one component from a simulator.

22. The method of claim 15, wherein the first and second sets of weight factors have different values.

23. The method of claim 15, wherein
the first set of weight factors is a set of static weight values; and
the second set of weight factors includes current weight factor values used in an iterative optimization process, which includes the first determining, the second determining, and the first changing.

24. The method of claim 23, wherein the static weights are weights initially supplied by a user.

25. A computer readable medium, comprising:
a code arrangement instructing a processor to determine a value for each penalty component of an objective function, each penalty component including a penalty term multiplied by a weight factor from a first set of weight factors, the objective function including at least two penalty components;
a code arrangement instructing a processor to determine a worst penalty component using the determined penalty component values, wherein the worst penalty component is one of the penalty components with the greatest value; and
a code arrangement instructing a processor to change weight factors in a second set of weight factors that correspond to the determined worst penalty component and at least one other penalty component to create an adapted objective function such that the worst penalty component has increased emphasis.

26. A computer readable medium, comprising:
a code arrangement instructing a processor to first determine a value for each penalty component of an objective function, each component of the objective function including a term multiplied by a weight factor from a first set of weight factors, the objective function including at least one penalty component and at least one credit component;
a code arrangement instructing a processor to second determine whether a constraint violation exists based on the determined penalty component values;
a code arrangement instructing a processor to first change a weight factor in a second set of weight factors that corresponds to the credit component if the second determining determines that a constraint violation does not exist and;
a code arrangement instructing a processor to, if the second determining determines that a constraint violation does exist,
third determine a worst penalty component using the determined penalty component values, wherein the worst penalty component is one of the penalty components with the greatest value, and
second change weight factors in the second set of weight factors corresponding to the determined worst penalty component and at least one other component in the second set of weight factors to create an adapted objective function such that the worst penalty component has increased emphasis.

27. A computer implemented method of adaptively adjusting an objective function providing a figure of merit for a proposed solution to a nuclear constraint problem with a processing device, comprising:
determining a value for each penalty component of the objective function, each penalty component including a penalty term multiplied by a weight factor from a first set of weight factors, the objective function including at least two penalty components;
determining a worst penalty component using the determined penalty component values, wherein the worst penalty component is one of the penalty components with the greatest value; and
changing weight factors in a second set of weight factors that correspond to the determined worst penalty component and at least one other penalty component to create an adapted objective function such that the worst penalty component has increased emphasis.

28. The method of claim 27, wherein the determining a value, the determining the worst penalty component and the changing weight factors form part of an optimization process run at a computer system in response to a request from a user.

29. A computer implemented method of adaptively adjusting an objective function providing a figure of merit for a proposed solution to a nuclear reactor constraint problem with a processing device, comprising:

first determining a value for each penalty component of the objective function, each component of the objective function including a term multiplied by a weight factor from a first set of weight factors, the objective function including at least one penalty component and at least one credit component;

second determining whether a constraint violation exists based on output from the determining a value;

if the second determining determines that a constraint violation does not exist, first changing a weight factor in a second set of weight factors that corresponds to the credit component; and if the second determining determines that a constraint violation does exist, third determining a worst penalty component using the determined penalty component values, wherein the worst penalty component is one of the penalty components with the greatest value, and second changing weight factors in the second set of weight factors corresponding to the determined worst penalty component and at least one other component in the second set of weight factors to create an adapted objective function such that the worst penalty component has increased emphasis.

30. The method of claim 29, wherein the first determining a value, the second determining whether a constraint violation exists, the first changing a weight factor, the third determining a worst penalty component, and the second changing weight factors form part of an optimization process run at a computer system in response to a request from a user.

* * * * *